(12) United States Patent
Moon et al.

(10) Patent No.: US 11,960,329 B2
(45) Date of Patent: Apr. 16, 2024

(54) COMPUTING DEVICES WITH RETRACTABLE HINGES

(71) Applicant: Hewlett-Packard Development Company, L.P., Spring, TX (US)

(72) Inventors: Hyunmin Moon, Spring, TX (US); Jin Sang Hwang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 122 days.

(21) Appl. No.: 17/636,068

(22) PCT Filed: Nov. 17, 2019

(86) PCT No.: PCT/US2019/061899
§ 371 (c)(1),
(2) Date: Feb. 17, 2022

(87) PCT Pub. No.: WO2021/096536
PCT Pub. Date: May 20, 2021

(65) Prior Publication Data
US 2022/0357777 A1  Nov. 10, 2022

(51) Int. Cl.
*G06F 1/16* (2006.01)
(52) U.S. Cl.
CPC ................... *G06F 1/1681* (2013.01)
(58) Field of Classification Search
CPC .................................................. G06F 1/1681
See application file for complete search history.

(56) References Cited

U.S. PATENT DOCUMENTS

| 9,411,365 | B1 | 8/2016 | Tanner et al. |
| 10,036,188 | B1 | 7/2018 | Yao et al. |
| 10,076,176 | B2 | 9/2018 | Yang et al. |
| 11,537,173 | B2* | 12/2022 | Kim ............... G06F 1/1616 |
| 2011/0001405 | A1* | 1/2011 | Tsao ............... G06F 1/1681 |
| | | | 312/223.1 |

(Continued)

FOREIGN PATENT DOCUMENTS

| CN | 205596165 U | 9/2016 |
| EP | 0659010 B1 | 5/2000 |
| EP | 3386172 A1 | 10/2018 |

OTHER PUBLICATIONS

Jurrien, I., "Samsung Galaxy Fold 2 foldable smartphone models," Aug. 30, 2019, Letsgodigital, retrieved at, <https://en.letsgodigital.org/smartphones/samsung-galaxy-fold-2-foldable-phone/>, 13 pages.

*Primary Examiner* — Adrian S Wilson
(74) *Attorney, Agent, or Firm* — Knobbe, Martens, Olson & Bear, LLP (57) ABSTRACT

An example computing device includes: a display housing including a first recess and a base including a second recess; and a hinge to rotate the display housing from a closed configuration to an open configuration, the hinge comprising: a central bar; a first link coupled to the central bar at a first pivot point, the first link rotatable about the first pivot point; and a second link coupled to the central bar at a second pivot point, the second link rotatable about the second pivot point; and wherein in response to the display housing rotating to the open configuration, a first sliding end of the first link is to retract into the first recess and a second sliding end of the second link is to retract into the second recess.

17 Claims, 5 Drawing Sheets

(56) References Cited

U.S. PATENT DOCUMENTS

| | | |
|---|---|---|
| 2011/0128216 A1 | 6/2011 | Renwick |
| 2011/0177850 A1 | 7/2011 | Griffin et al. |
| 2011/0205695 A1 | 8/2011 | Hassemer et al. |
| 2012/0042473 A1* | 2/2012 | Wang .................... G06F 1/1681 |
| | | 16/319 |
| 2016/0123054 A1 | 5/2016 | Senatori |
| 2018/0046227 A1 | 2/2018 | Tazbaz |
| 2018/0049336 A1 | 2/2018 | Manuel et al. |
| 2018/0196468 A1 | 7/2018 | Watamura et al. |
| 2018/0284839 A1* | 10/2018 | Lin ......................... H04M 1/02 |
| 2020/0285274 A1* | 9/2020 | Lin ........................... G06F 1/16 |

\* cited by examiner

COMPUTING DEVICES WITH RETRACTABLE HINGES

BACKGROUND

Computing devices may include hinges. A hinge may allow portions of the computing devices to be folded or rotated against each other for compactness. Further, a hinge may allow a computing device to be unfolded or rotated apart for utility during use.

DETAILED DESCRIPTION

Computing devices, such as personal computers, laptops, tablets, mobile computing devices, and the like, may include portions connected by hinges to allow the portions to rotate relative to each other. For example, computing devices may include a base and a display housing connected by a hinge. In some examples, the base may include a keyboard and trackpad, while the display housing houses a screen or a display. In other examples, both the base and the display housing may house screens or displays. Such computing device may be unfolded to a flat configuration to provide a larger, combined display area. The hinges of such computing devices may cause the base and the display housing to be separated by a distance, thereby interrupting the combined display area.

Some computing devices may therefore be rotated to form a flat configuration, and then, while in the flat configuration, brought together so that the hinge is retracted to bring the two portions adjacent each other. Other computing devices may employ a hinge in between the portions of the device, around which the portions rotate. The hinge protrudes from the device in the flat configuration to allow the portions to be adjacent each other, thereby still interrupting a portion of the combined display area.

An example computing device includes a display housing and a base rotatably coupled by a hinge and rotatable between a closed configuration and an open configuration. In response to the display housing rotating to the open configuration, the hinge is retracted into a first recess of the display housing and a second recess of the base. The hinge includes a central bar, a first link coupled to the central bar to rotate the display housing about a first pivot point, and a second link coupled to the central bar to rotate the base about a second pivot point. In response to the display rotating, respective sliding ends of the first and second links slide into the respective recesses of the display housing and the base. The computing device is thus able to rotate around a virtual pivot point external to the hinge to allow the base and the display housing to be flush against one another when in flat in the open configuration.

Figure 1:
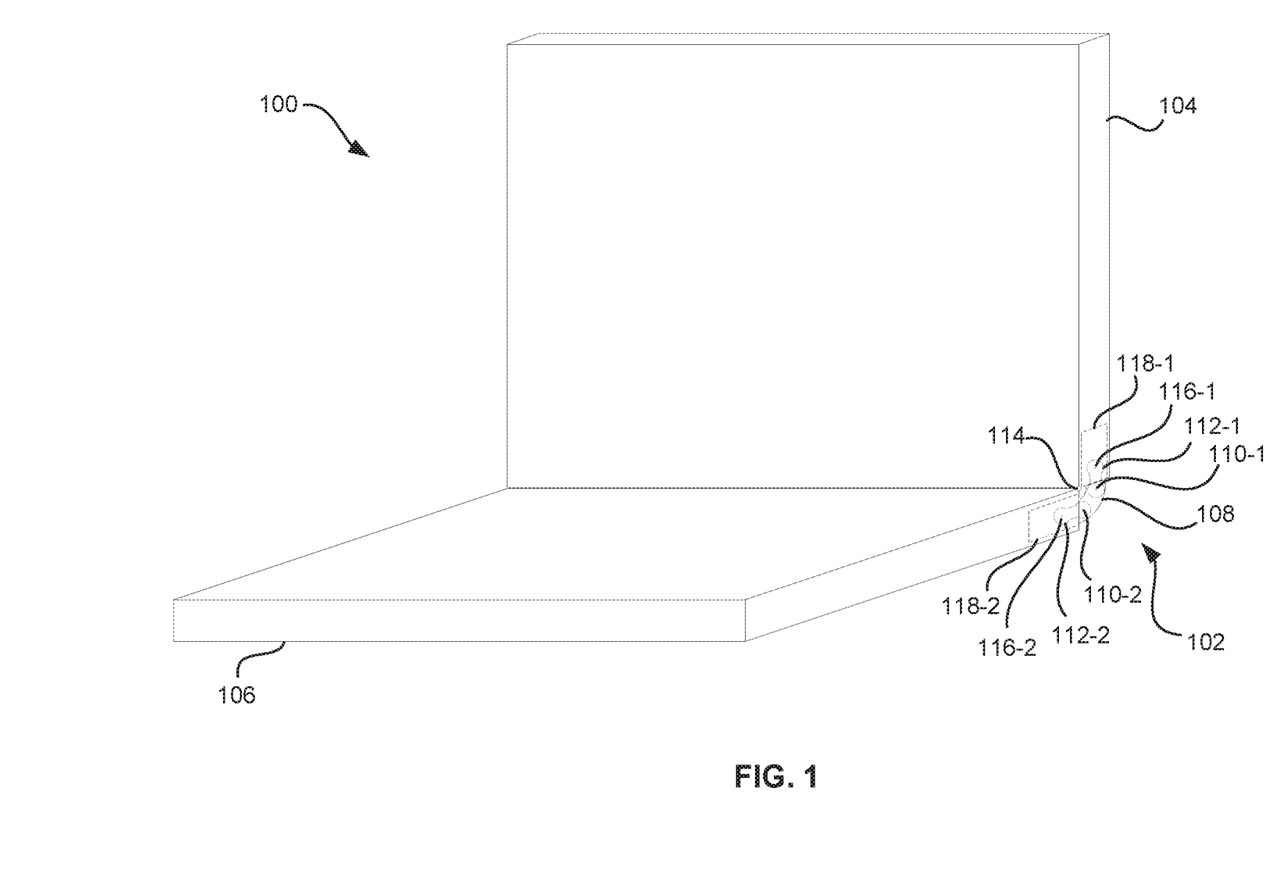
FIG. 1 is a perspective view of an example computing device with a retractable hinge.

FIG. 1 shows a schematic diagram of an example computing device 100 including an example retractable hinge 102. The computing device 100 includes a display housing 104 and a base 106 coupled by the hinge 102. The hinge 102 allows the computing device 100 to be rotated from a closed configuration, in which the display housing 104 is closed against the base 106, to an open configuration, in which the display housing 104 is opened apart from the base 106. In other words, the hinge 102 rotates the display housing 104 from the closed configuration against the base 106 to the open configuration apart from the base 106.

The hinge 102 has a central bar 108 including a first pivot point 110-1 and a second pivot point 110-2. The hinge 102 is coupled to the display housing 104 such that the display housing 104 rotates relative to the central bar 108 about the first pivot point 110-1. The hinge 102 is coupled to the base 106 such that the base 106 rotates relative to the central bar 108 about the second pivot point 110-2. For example, the hinge 102 includes a first link 112-1 coupled to the central bar 108 at the first pivot point 110-1. The first link 112-1 is to couple the hinge 102 to the display housing 104 and is rotatable about the first pivot point 110-1 to allow the display housing 104 to rotate relative to the central bar 108 about the first pivot point 110-1. The hinge 102 further includes a second link 112-2 coupled to the central bar 108 at the second pivot point 110-2. The second link 112-2 is to couple the hinge 102 to the base 106 and is rotatable about the second pivot point 110-2 to allow the base 106 to rotate relative to the central bar 108 about the second pivot point 110-2.

When the display housing 104 is rotated about the first pivot point 110-1 and the base 106 is about the second pivot point 110-2, the hinge 102 rotates the display housing 104 relative to the base 106 about a main pivot point 114. The main pivot point 114 is external to the hinge 102 and has a fixed spatial position. In other words, the main pivot point 114 is a virtual pivot point about which the computing device 100 rotates. In particular, the main pivot point 114 may be at adjacent corners of the base 106 and the display housing 104, as depicted in FIG. 1.

In particular, to enable rotation about the main pivot point 114, the first link 112-1 has a first sliding end 116-1 which retracts into a first recess 118-1 of the display housing 104 in response to the display housing 104 rotating to the open configuration. Similarly, the second link 112-2 has a second sliding end 116-2 which retracts into a second recess 118-2 of the display housing 104 in response to the display housing 104 rotating to the open configuration. In other words, the first link 112-1 slides along the display housing 104 into the first recess 118-1 and the second link 112-2 slides along the base 106 into the second recess 118-2 when the display housing 104 is rotated relative to the base 106 to maintain the fixed spatial position of the main pivot point 114.

For example, the hinge 102 may thus rotate the computing device 100 from a folded configuration (i.e., from the closed configuration, or an open configuration wherein there is an angle of less than 180° between the base 106 and the display housing 104) to a flat configuration (i.e., wherein there is an angle of 180° between the base 106 and the display housing 104). In response to the computing device 100 rotating to the flat configuration, the hinge 102 is retracted into the display housing 104 and the base 106 to enable the display housing 104 and the base 106 to be flush against one another.

Figure 2:
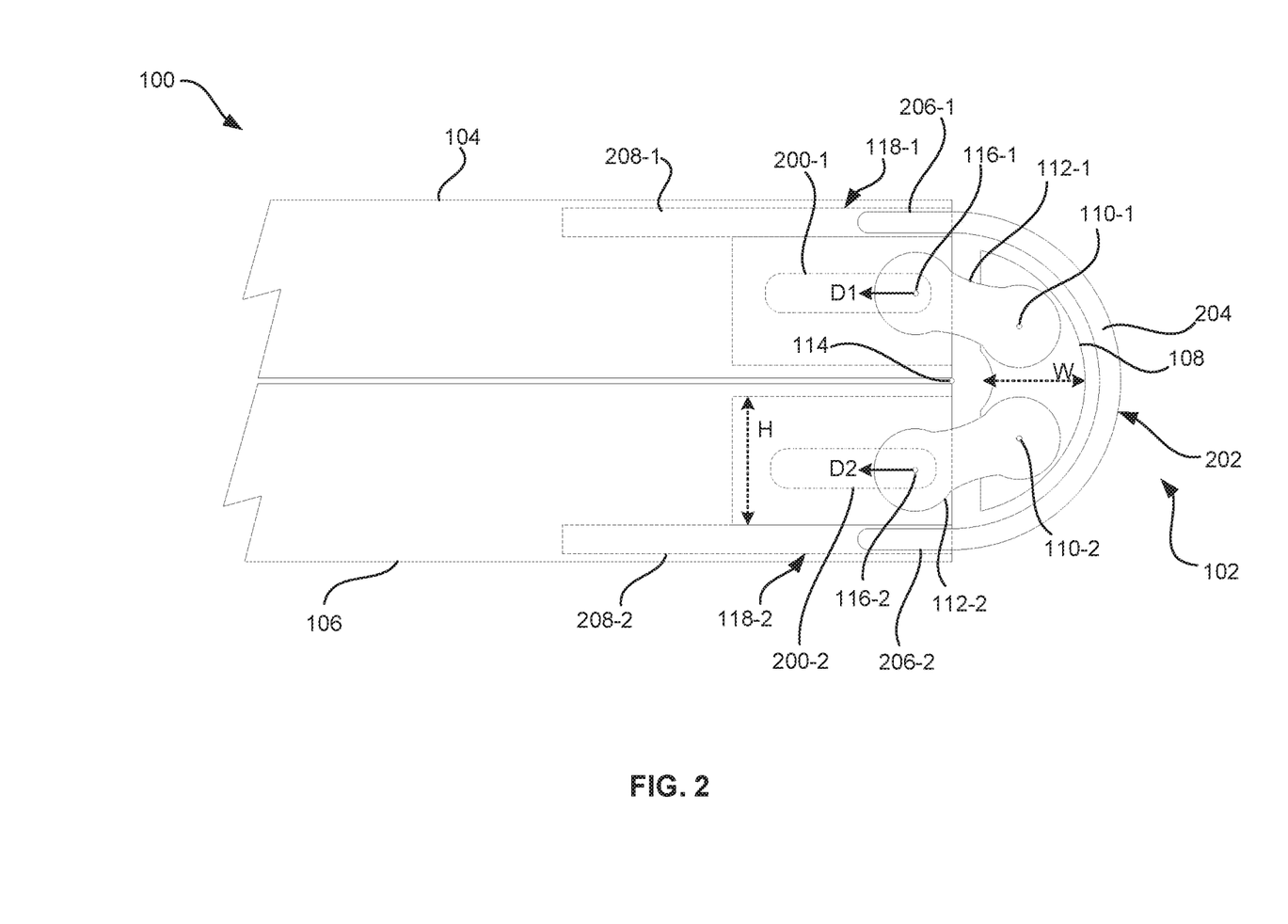
FIG. 2 is a cross-sectional view of the retractable hinge of FIG. 1 when the computing device is in a closed configuration.

FIG. 2 depicts a cross sectional view of the hinge 102 when the computing device 100 is in the closed configuration. In particular, FIG. 2 depicts the central bar 108, the first and second links 112-1, 112-2, and the first and second recesses 118-1, 118-2, in greater detail.

The central bar 108 is shaped to be received in the first and second recesses 118-1, 118-2. In particular, a first portion of the central bar 108 is to be received in the first recess 118-1, and a second portion is to be received in the second recess 118-2. Thus, a width W of the central bar 108 may be smaller than a height H of the first and second recesses 118-1, 118-2 to allow the central bar 108 to be received therein. Further, the central bar 108 may have a curved exterior surface to facilitate being received in the first and second recesses 118-1, 118-2 as the computing device 100 is rotated to the open configuration.

The first and second links 112-1, 112-2 are rotatably coupled to the central bar 108 and, respectively, to the display housing 104 and the base 106. In some examples, the first link 112-1 and the second link 112-2 may be 360-degree hinges, That is, the first and second links 112-1 and 112-2 may have two connection points about which the connected components are to rotate, to allow for 360-degree rotation of the connected components. In particular, first and second links 112-1, 112-2 are connected at a first of the two connection points at, respectively, the first and second pivot points 110-1 and 112-2 of the central bar 108. The first and second links 112-1, 112-2 may also be connected at a second of the two connection points in the first and second recesses 118-1 and 118-2. In particular, the second of the two connection points may act as the respective sliding ends 116-1 and 116-2 of the first and second links 112-1, 112-2.

In some examples, the first recess 118-1 may include a first track 200-1 to guide the first sliding end 116-1 into the first recess 118-1. Similarly, the second recess 118-2 may include a second track 200-2 to guide the second sliding end 116-2 into the second recess 118-2. The first link 112-1, and in particular, the first sliding end 116-1, may be received in the first track 200-1 to position the first sliding end 116-1 within the first recess 118-1. The second link 112-2, and in particular the second sliding end 116-2, may be received in the second track 200-2 to position the second sliding end 116-2 within the second recess 118-2. For example, the first and second tracks 200-1, 200-2 may reduce lateral movement of the first and second sliding ends 116-1, 116-2 as they are retracted into the first and second recesses 118-1, 118-2. In other examples, the first track 200-1 and the second track 200-2 may have a curved shape, a zig-zag shape, or other suitable shapes to guide the first sliding end 116-1 and the second sliding end 116-2 within the first recess 118-1 and the second recess 118-2, respectively.

In some examples, the computing device 100 may further include a cover 202 extending between the display housing 104 and the base 106 around an exterior of the hinge 102, The cover 202 is to protect the central bar 108, the first link 112-1, and the second link 112-2. The cover 202 may include a central portion 204 disposed around the central bar 108, the first link 112-1, and the second link 112-2, The cover 202 may also include a first extension 206-1 extending into the first recess 118-1 and a second extension 206-2 extending into the second recess 118-2. In response to the display housing 104 rotating to the open configuration, the first extension 206-1 retracts into the first recess 118-1 and the second extension 206-2 retracts into the second recess 118-2. Accordingly, the cover 202 may be formed of a durable, flexible material to provide protection to the hinge 102, while allowing the cover 202 to conform to the shape of the hinge 102 and the shapes of the first and second recesses 118-1, 118-2 in the open and closed configurations, respectively.

Additionally, the first recess 118-1 may include a first cover track 208-1 to guide the first extension 206-1 in the first recess 118-1 and the second recess 118-2 may include a second cover track 208-2 to guide the second extension 206-2 in the second recess 118-2. In some examples, the computing device 100 may include two singly formed recesses 118-1, 118-2 including (i) the first and second tracks 200-1, 200-2 to guide the first and second links 112-1, 112-2 and (ii) the first and second cover tracks 208-1, 208-2 to guide the first and second extensions 206-1, 206-2. In other examples, the computing device 100 may include separate recesses for the first and second tracks 200-1, 200-2 and the first and second cover tracks 208-1, 208-2. That is, in some examples, the first and second cover tracks 208-1, 208-2 may be formed separate recesses from the first and second recesses 118-1, 118-2.

In operation, in response to the computing device 100 rotating to an open configuration, the first sliding end 116-1 slides in a direction D1 along the first track 200-1 and the second sliding end 116-2 slides in a direction D2 along the second track 200-2. Similarly, in response to the computing device 100 rotating to the open configuration, the first extension 206-1 slides along the first cover track 208-1 and the second extension 206-2 slides along the second cover track 208-2.

Figure 3:
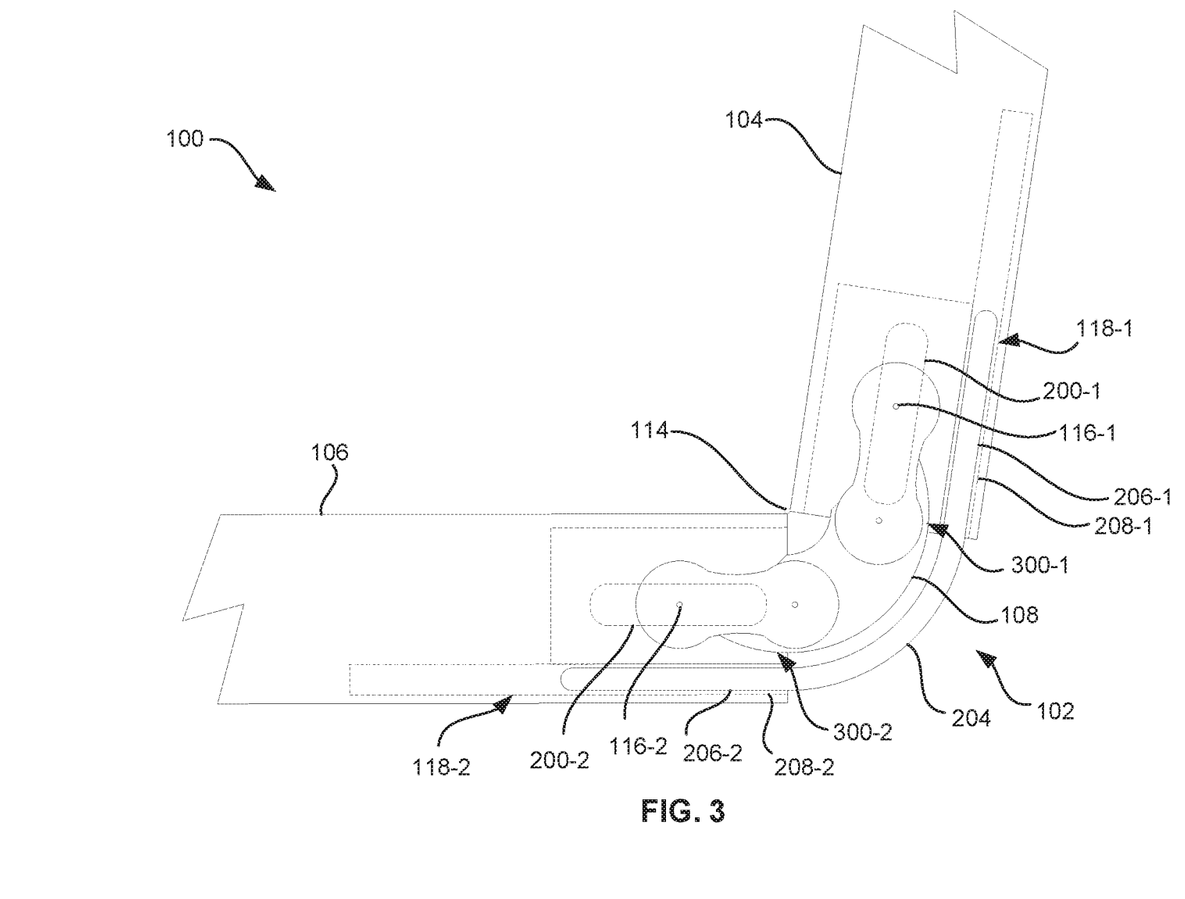
FIG. 3 is a cross-sectional view of the retractable hinge of FIG. 1 when the computing device is in an open, folded configuration.

For example, as depicted in FIG. 3, the first sliding end 116-1 is partially retracted into the first recess 118-1, as guided by the first track 200-1. The second sliding end 116-2 is partially retracted into the second recess 118-2, as guided by the second track 200-2. Additionally, a first portion 300-1 of central bar 108 is partially received in the first recess 118-1 and a second portion 300-2 of the central bar 108 is partially received in the second recess 118-2.

The rotation of the display housing 104 about the first pivot point 110-1 and the rotation of the base 106 about the second pivot point 110-2 in combination with the retraction of the hinge 102 into the first and second recesses 118-1, 118-2 thus allows the computing device 100 to be rotated about the virtual main pivot point 114, while maintaining the main pivot point 114 in a fixed spatial position. For example, the hinge 102 may thus rotate the computing device 100 about the main pivot point 114 at adjacent corners of the base 106 and the display housing 104.

Further, as the computing device 100 is rotated to the open configuration, the first extension 206-1 retracts into the first recess 118-1, as guided by the first cover track 208-1 and the second extension 206-2 retracts into the second recess 118-2, as guided by the second cover track 208-2. The central portion 204 of the cover 202 may also begin to flatten out as the portions adjacent the first and second extensions 206-1, 206-2 are received into the first and second recesses 118-1, 118-2.

Figure 4:
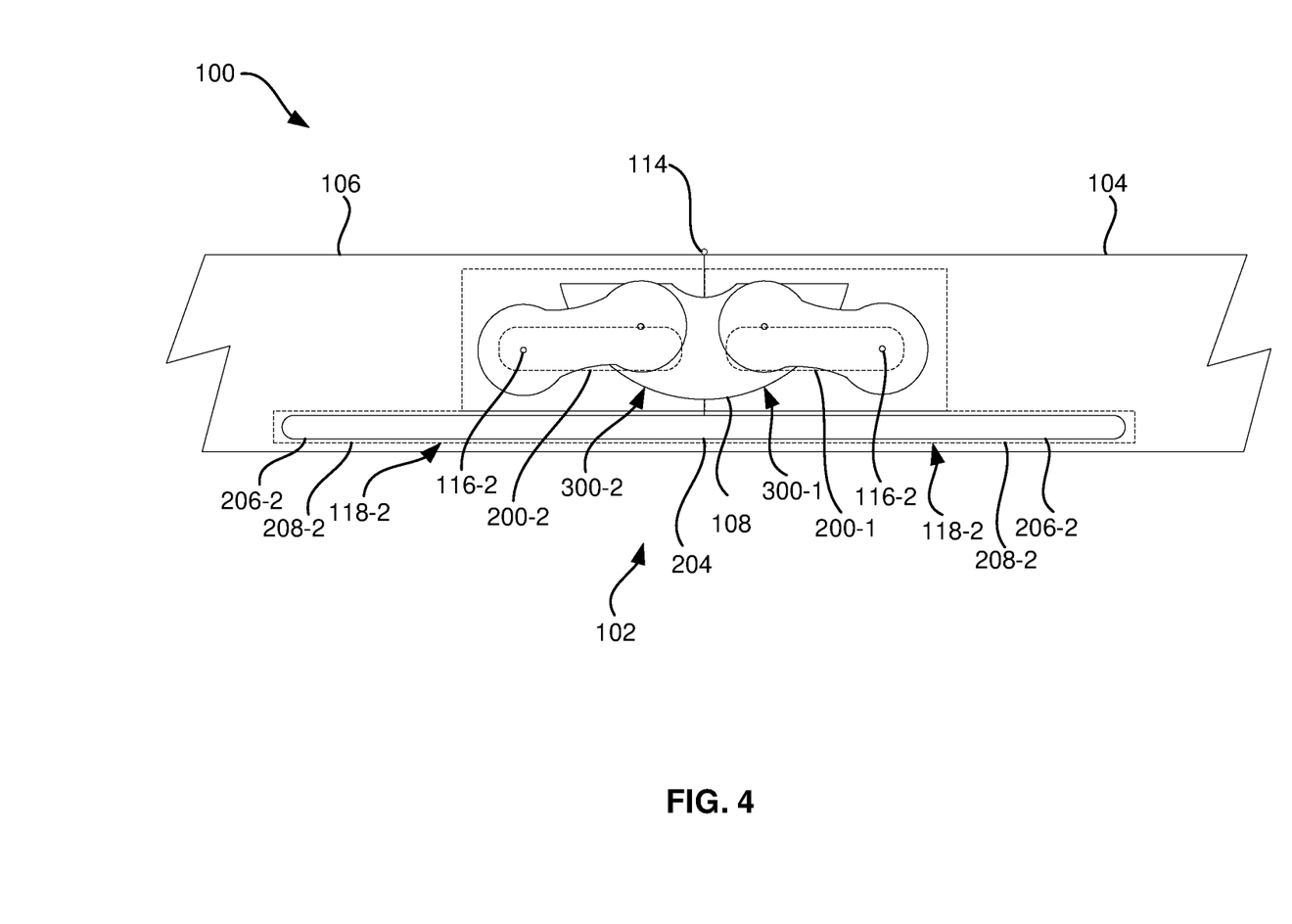
FIG. 4 is a cross-sectional view of the retractable hinge of FIG. 1 when the computing device is a flat configuration.

Referring now to FIG. 4, the computing device 100 is depicted in a flat configuration. In response to the computing device 100 rotating to the flat configuration, the hinge 102 is retracted into the display housing 104 and the base 106 to enable the display housing 104 and the base 106 to be flush against one another in the flat configuration. In particular, the hinge 102 may continue to rotate the computing device 100 about the main pivot point 114 at the adjacent corners of the base 106 and the display housing 104 until the ends of the display housing 104 and the base 106 are flush against one another.

Accordingly, the first sliding end 116-1 is fully retracted into the first recess 118-1 and the second sliding end 116-2 is fully retracted into the second recess 118-2. Additionally, the first portion 300-1 of the central bar 108 is received in the first recess 118-1 and the second portion 300-2 of the central bar 108 is received in the second recess 118-2. Further, in response to the computing device 100 rotating to the flat configuration, the first extension 206-1 retracts into the first recess 118-1 and the second extension 206-2 retracts into the second recess 118-2. The central portion 204 of the cover 202 may also flatten out as it is received into the first and second recesses 118-1, 118-2. The hinge 102 and the cover 202 are thus fully retracted into the display housing 104 and the base 106.

Figure 5:
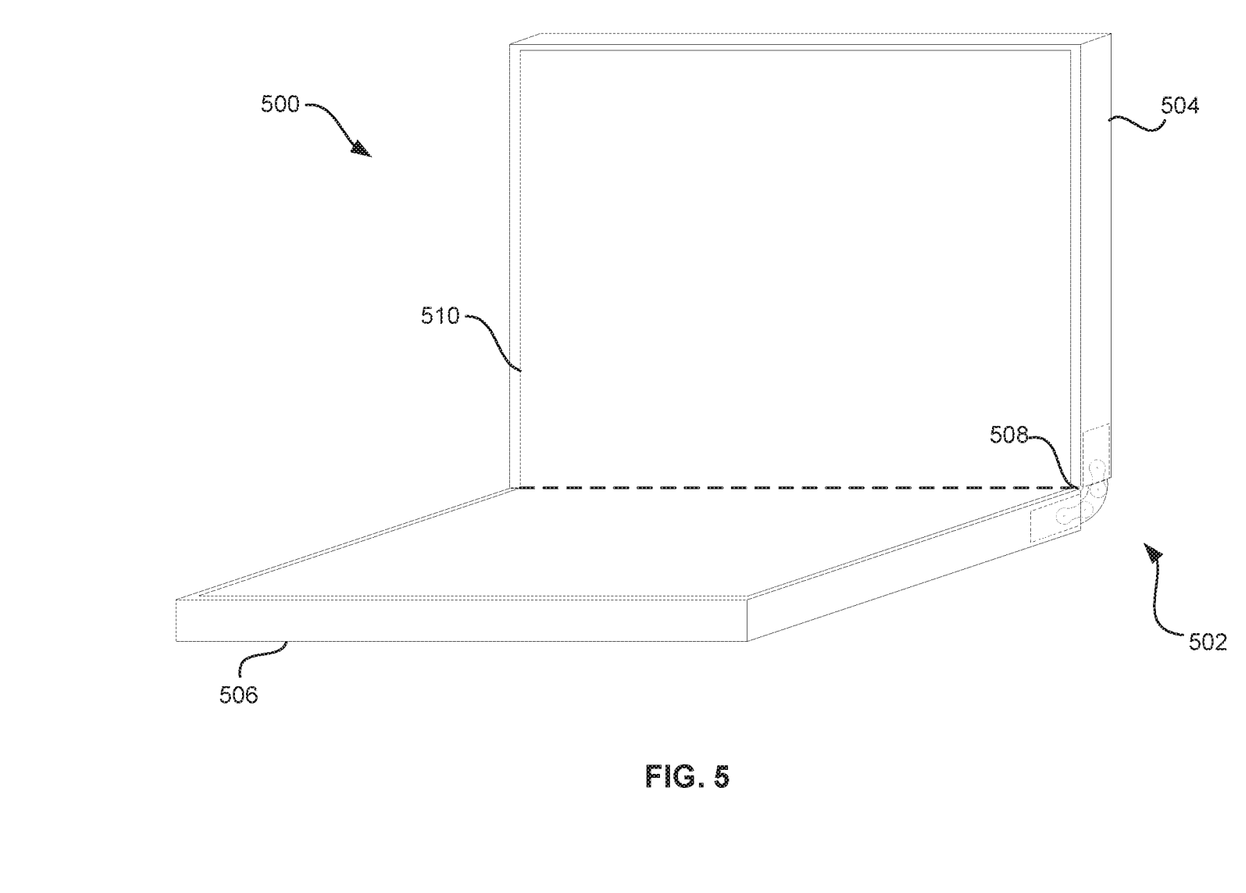
FIG. 5 is a perspective view of an example computing device with a retractable hinge and a flexible display.

Referring to FIG. 5, an example computing device 500 including a retractable hinge 502 is depicted. The computing device 500 includes a display housing 504 and a base 506. The hinge 502 is to rotate the computing device 500 from a folded configuration to a flat configuration. In response to the computing device 500 rotating to the flat configuration, the hinge 502 is retracted into the display housing 504 and the base 506 to enable the display housing 504 and the base 506 to be flush against one another in the flat configuration.

In particular, the hinge 502 is to rotate the computing device 500 about a pivot point 508 at adjacent corners of the base 506 and the display housing 504. The hinge 502 retracts into the display housing 504 and the base 506 to maintain a fixed spatial position of the pivot point 508. Accordingly, the computing device 500 may further include a flexible display 510 supported on and extending over the display housing 504 and the base 506. Since the computing device 500 rotates about the spatially fixed pivot point 508, the flexible display 510 may extend across both the display housing 504 and the base 506 without damaging the flexible display 510 when the computing device 500 is rotated between the flat configuration and folded configurations. Additionally, maintaining the spatial position of the pivot point 508 allows the flexible display 510 to be supported in the same position on the display housing 504 and the base 506 without moving or sliding when the computing device 500 is rotated to different configurations. The computing device 500 thus reduces the mechanical complexity of having the flexible display 510 extending over the display housing 504 and the base 506.

As described above, an example computing device includes a display housing and a base are coupled by a hinge to rotate the computing device from an open configuration to a closed configuration. The display housing and the base include recesses to allow the hinge to be retracted therein. In particular, links coupling a central bar of the hinge to the display housing and the base slide along the display housing and the base into the recesses. The computing device may thus maintain its pivot point to allow the display housing and the base to be flush against one another when in a flat configuration. The computing device with the retractable hinge allows the base and the display housing to be adjacent in response to rotation of the computing device. A combined display area of the base and the display housing may therefore be provided with a smaller space therebetween. The computing device with the retractable hinge may further allow a flexible display to extend across the display housing and the base by maintaining the pivot point at a fixed spatial position.

The scope of the claims should not be limited by the above examples, but should be given the broadest interpretation consistent with the description as a whole.

The invention claimed is:

1. A computing device comprising:
   a display housing including a first recess and a base including a second recess; and
   a hinge to rotate the display housing from a closed configuration to an open configuration, the hinge comprising:
      a central bar;
      a first link coupled to the central bar at a first pivot point, the first link rotatable about the first pivot point;
      a second link coupled to the central bar at a second pivot point, the second link rotatable about the second pivot point; and
      a cover extending between the display housing and the base and around an exterior of the hinge, wherein the cover is slidably connected to the display housing or the base;
   wherein in response to the display housing rotating to the open configuration, a first sliding end of the first link is to retract into the first recess and a second sliding end of the second link is to retract into the second recess.

2. The computing device of claim 1, wherein the first recess comprises a first track to guide the first sliding end of the first link; and wherein the second recess comprises a second track to guide the second sliding end of the second link.

3. The computing device of claim 1, wherein in response to the display housing rotating to the open configuration, a first portion of the central bar is received into the first recess with the first link; and a second portion of the central bar is received into the second recess with the second link.

4. The computing device of claim 1, wherein the cover comprises:
   a central portion disposed around the central bar, the first link, and the second link;
   a first extension extending into the first recess; and
   a second extension extending into the second recess; and
   wherein in response to the display housing rotating to the open configuration, the first extension is to retract into the first recess and the second extension is to retract into the second recess.

5. The computing device of claim 4, wherein the first recess comprises a first cover track to guide the first extension in the first recess; and wherein the second recess comprises a second cover track to guide the second extension in the second recess.

6. The computing device of claim 1, wherein the first link and the second link comprise 360-degree hinges.

7. A computing device comprising:
   a display housing and a base; and
   a hinge comprising:
      a central bar;
      a first pivot point of the central bar about which the display housing is rotated relative to the central bar;
      a second pivot point of the central bar about which the base is rotated relative to the central bar; and
      a cover extending between the display housing and the base and around an exterior of the hinge, wherein the cover is slidably connected to the display housing or the base;
   wherein, when the display housing is rotated about the first pivot point and the base is rotated about the second pivot point, the hinge is to rotate the display housing relative to the base about a main pivot point external to the hinge, the main pivot point having a fixed spatial position.

8. The computing device of claim 7, wherein the hinge further comprises:
   a first link rotatable about the first pivot point, the first link to couple the hinge to the display housing; and a second link rotatable about the second pivot point, the second link to couple the hinge to the base.

9. The computing device of claim 8, wherein the first link is to slide along the display housing and the second link is to slide along the base when the display housing is rotated relative to the base to maintain the fixed spatial position of the main pivot point.

10. The computing device of claim 7, wherein the main pivot point is at adjacent corners of the base and the display housing.

11. A computing device comprising:
a display housing and a base;
a hinge to rotate the computing device from a folded configuration to a flat configuration; and
a cover extending between the display housing and the base and around an exterior of the hinge, wherein the cover is slidably connected to the display housing or the base;
wherein in response to the computing device rotating to the flat configuration, the hinge is retracted into the display housing and the base to enable the display housing and the base to be flush against one another in the flat configuration.

12. The computing device of claim 11, wherein the hinge is to rotate the computing device about a pivot point at adjacent corners of the base and the display housing.

13. The computing device of claim 12, further comprising a flexible display extending over the display housing and the base.

14. The computing device of claim 11, wherein the display housing comprises a first recess to receive a first portion of the hinge, and wherein the base comprises a second recess to receive a second portion of the hinge.

15. The computing device of claim 11, wherein the cover is slidably connected to the display housing and the base.

16. The computing device of claim 7, wherein the cover is slidably connected to the display housing and the base.

17. The computing device of claim 1, wherein the cover is slidably connected to the display housing and the base.

* * * * *